UNITED STATES PATENT OFFICE.

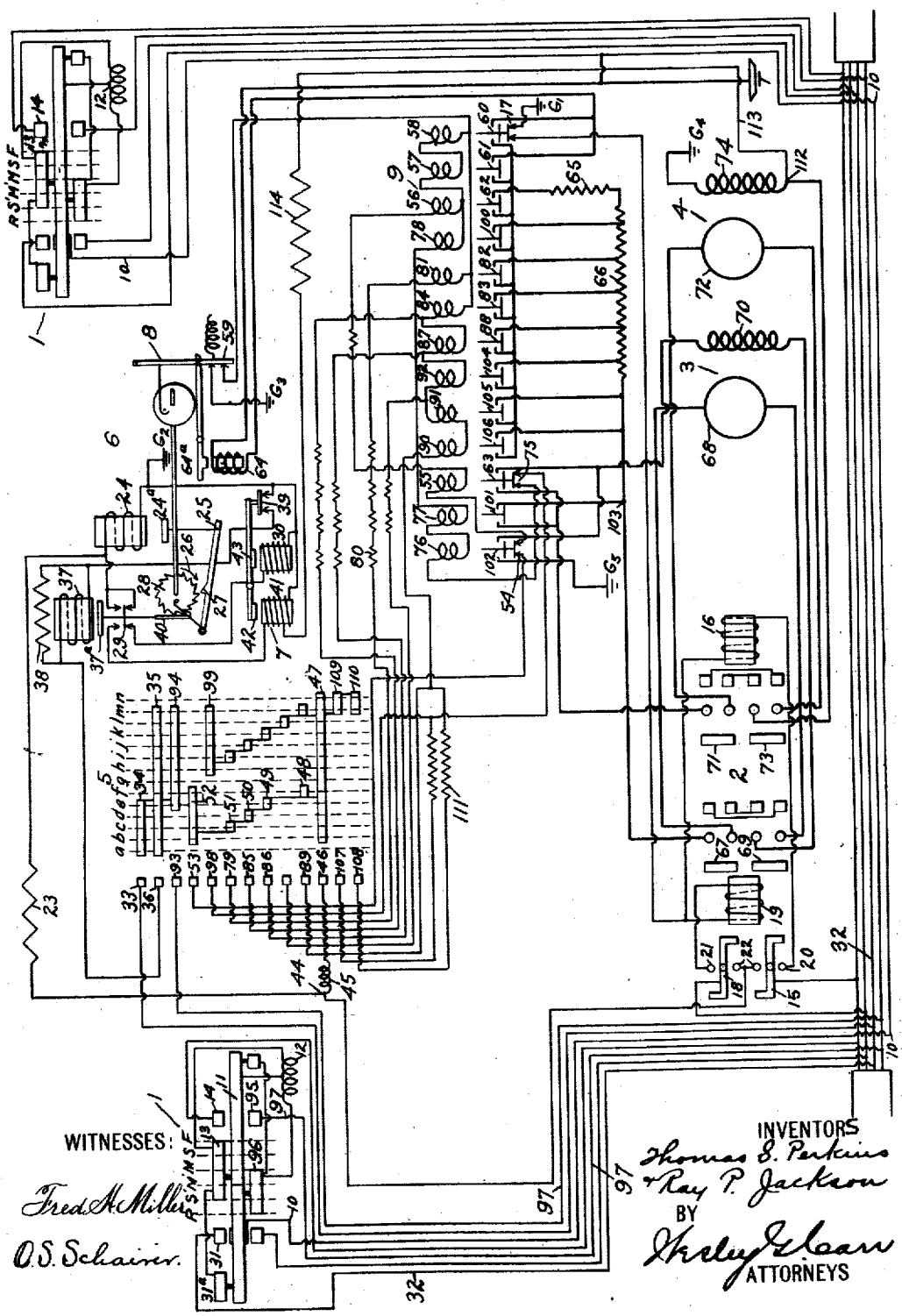

THOMAS S. PERKINS AND RAY P. JACKSON, OF WILKINSBURG, PENNSYLVANIA, ASSIGNORS TO WESTINGHOUSE ELECTRIC & MANUFACTURING COMPANY, A CORPORATION OF PENNSYLVANIA.

SYSTEM OF REMOTE CONTROL FOR ELECTRIC MOTORS.

No. 814,323.

Specification of Letters Patent.

Patented March 6, 1906.

Application filed June 6, 1904. Serial No. 211,368.

*To all whom it may concern:*

Be it known that we, THOMAS S. PERKINS and RAY P. JACKSON, citizens of the United States, and residents of Wilkinsburg, in the county of Allegheny and State of Pennsylvania, have invented a new and useful Improvement in Systems of Remote Control for Electric Motors, of which the following is a specification.

Our invention relates to systems of control for electric motors, and particularly to such systems as are employed to control from a remote point or any one of several remote points one or more individually-operated units, each of which is equipped with two or more electric motors.

The object of our invention is to combine into a system of extreme simplicity all of the controlling and protective means necessarily and ordinarily employed in connection with electric motors.

An important and novel feature of our invention consists of a plurality of electromagnetically-operated controller-drums, one for each individually-operated unit and all of which shall be so governed from a remote simple master-switch that they may be rotated automatically step by step at a predetermined rate and may be stopped and started again or returned to their initial positions at the will of the operator. These controllers govern the circuits of electromagnetically-operated switches located in the motor-circuits, the number and combinations of which may be readily varied without the use of complicated relays or extra control-wires. A novel limit device operates at any notch to prevent further rotation of the controller-drum if and while the current taken by the motors exceeds a certain predetermined amount, and an overload on the motors effects the operation of a release which allows the switches in the motor-circuits to open and makes necessary the return of the operating-switch to the "off" position before current can be again supplied to the motors.

One of the chief advantages of our system lies in the fact that ordinarily only four train-wires are required in order to control the operation of all of the motors—viz., one wire for each of the forward and reverse positions of the reverse-switch and one for each of the full series and full parallel positions of the master-switch. If more running positions are desired, a control-wire must be employed for each additional position.

Other novel features and advantages of our system will be hereinafter pointed out and described in connection with those already mentioned.

Our invention is illustrated in the single figure of the accompanying drawing.

The system comprises as its main and essential features one or more master-switches 1, an electromagnetically-operated reversing-switch 2, motors 3 and 4, properly connected with the reversing-switch 2, a controller-drum 5, operating means 6 therefor, a time controller and limit device 7 for said operating means, an overload release device 8, and electromagnetically-operated switches 9.

The operation of our system may be best understood from the following description of the circuits through the various devices for each of the positions of the master-switch and controller-drum. The first position of the master-switch 1 when moved either forward or backward serves to make the necessary connections for setting the reversing-switch 2 in its proper corresponding position, the position F corresponding to forward motion of the train and the position R to the backward motion. In the position F the circuit is from a current-collector, such as a trolley or third-rail plow T, through the conductor 10, the drum-ring 11, one-half of the blow-out coil 12, drum-contact 13, finger 14, interlocking-switch contact-piece 15 and finger 20 of the reversing-switch 2, the magnet-coil 16, and the interlocking switch 17, to the ground at G'.

The position of the reversing-switch 2 shown in the drawing is an unnatural one, since the circuits of the motor will always be connected either for forward or reverse rotation, except while the reversing-switch is in motion, and consequently the one or the other of the pieces 15 and 18 will be in position to complete the circuits of the one or the other of the magnets 16 and 19. If the reversing-switch at the outset had been in the position corresponding to backward motion of the train, the piece 15 would have been in engagement with the finger 20, and upon moving the master-switch to the position F the magnet 16 would have become energized, thus causing the reversing-switch to be thrown to a position corresponding to forward motion of the train, the piece 15 to be disengaged from the finger 20, and the piece 18 to be engaged by the finger 21. Then if the master-switch should be moved to the position R the magnet 19 would be energized and the reversing-switch would be thrown to a position corresponding to backward motion of the train.

When the reversing-switch 2 is thrown to either the forward or the backward position, either the piece 15 or the piece 18 engages the corresponding finger 22 and completes the circuit before mentioned from collector T, through the master-switch 1, to the contact-piece 15, through the resistance 23, coil 24 of the operating means 6, to the ground at $G^2$. The energizing of the coil 24 raises its armature $24^a$ and an attached lever 25, so that the operating-drum 5 may be rotated in the direction indicated by the arrow 26 by a means to be hereinafter described and be retained in the position to which it is moved by a pawl 27, which engages a ratchet-wheel 28, that is secured to one end of the drum 5. A shunt-circuit to that through the coil 24 also exists through an interlocking switch 29 and a coil 30 of the time controller device 7.

When the master-switch 1 is moved to the position S, the finger 31 engages the drum-contact $31^a$ and completes a circuit, in addition to that above described, from the drum-ring 11 of the master-switch 1, through the drum-contact $31^a$; finger 31, conductor 32, finger 33, drum-contacts 34 and 35, finger 36, operating coil 37, and discharge resistance 38 in parallel, and switch 39, to the ground at $G^2$. The contact-fingers 33 and 36 always engage the drum-contacts 34 and 35 when the controller-drum 5 is in its initial position. The energizing of the operating-coil 37 raises its armature $37^a$ and the attached pawl 40, and the latter engages the ratchet-wheel 28 on the end of the controller-drum 5 and causes it to turn through an angle corresponding to the pitch of the ratchet-teeth. At the same time the interlocking switch 29 is moved to close the circuit through the coil 41 of the time-controller 7, which accordingly attracts its armature 42 and opens the switch 39, thus breaking the circuit through the operating-coil 37. The latter being deënergized allows the pawl 40 to drop and engage the next tooth of the ratchet-wheel 28 and again close the circuit through the coil 30 of the time-controller 7. The switch 39 is then closed by the action of the magnet 30 upon its armature 43, and the operating-coil 37 is again energized, causing the controller-drum 5 to be rotated to the next position, the cycle of operations just described continuing until the position F is reached.

A discharge resistance 38 is shunted around the operating-coil 37 for the purpose of governing the rapidity of the operation of the mechanism, which may be varied by adjusting the amount of the resistance 38, a very simple and still a very desirable and important feature in systems of control in which the motors accelerate automatically. The rate of acceleration of a train may be varied at the will of an operator by employing a simple rheostat-arm in connection with the resistance 38, or the rate of acceleration may be made independent of the operator by permanently fixing the resistance at a value corresponding to a predetermined rate. In this manner trains may be accelerated with a minimum degree of discomfort to the passengers and at such rate that the motors are not abnormally loaded.

In the position $b$ of the controller-drum 5 a parallel circuit to that before described from the point 44 is through a blow-out coil 45, finger 46, drum-contacts 47, 48, 49, 50, 51, and 52, finger 53, interlocking switch 54, switch-magnet coils 55, 56, 57, and 58, switch 59, to the ground at $G^3$. The last-named coils when thus energized close switches 60, 61, 62, and 63 in the motor-circuits. If the reversing-switch 2 is in the position for forward motion of the train, energy is now supplied from the collector T, through an overload release-coil 64, switches 60 and 61 in parallel, switch 62, resistances 65 and 66, reversing-switch contact-block 67, the armature 68 of the motor 3, contact-block 69 of the reversing-switch, field-magnet winding 70 of the motor 1, switch 63, contact-block 71 of the reversing-switch, the armature 72 of the motor 4, contact-block 73 of the reversing-switch, and field-magnet winding 74 to the ground at $G^4$. Series connection of the motors through the full amount of resistance is thus effected.

Opening of the interlocking switch 17 is effected by the operation of the switch 60, and it then becomes impossible to operate the reversing-switch 2 until the master-switch has been returned to its off position, and in like manner the interlocking switch 75 is opened when the switch 63 is closed, thus preventing the energizing of switch-magnet coils 76 77 78 while the motors are connected in series.

If an overload occurs on the motors 3 and 4, such an amount of energy is supplied to the coil 64 that its armature $64^a$ is attracted and the spring-actuated switch 59 is opened, thus opening all of the circuits through the main switch-magnet coils, whereby the corresponding switches are opened. In order to again close the switch 59, it is necessary that the controller-drum 5 be returned to its initial position, which is accomplished only by returning the master-switch to the off position.

In the position $c$ of the controller-drum finger 79 makes contact with the drum-contact 51, and the circuit is closed through resistances 80 and main switch-magnet coil 81, thereby causing the switch 82 to close and shunting the resistance 65 and a portion of the resistance 66. A larger portion of the resistance 66 is shunted by the closing of the switch 83, through the action of the coil 84, when the controller-drum is moved to position $d$, in which position the finger 85 engages the drum-contact 50. Since finger 79 is out of engagement with the drum-contact 51 in position $d$, the switch-magnet coil 81 is deënergized and allows the switch 82 to open.

In position $e$ the drum-contact 49 engages finger 86 and the switch-magnet coils 87 and 84 become energized, the switch 83 being thereby held in closed position and the switch 88 being closed to shunt another portion of the resistance 66.

In position $f$ of the controller-drum the drum-contact 48 engages finger 89, switch-magnet coils 90, 91, 92, 87, and 84 are energized, and the corresponding switches are closed, leaving the motors 3 and 4 connected in full series without resistance in circuit. When the controller-drum has reached position $f$, the finger 31 no longer engages the drum-contact 32 and the circuit to the operating-coil 37 is interrupted, for which reason the operating mechanism 6 becomes idle, and the controller-drum remains in position $f$ until the master-switch 1 is moved to position S.

In position $e$ of the controller-drum contact-finger 93 engages the drum-contact 94, so that when the master-switch 1 is moved to position S the operating mechanism 6 may proceed to actuate the controller-drum.

It has been noted that resistances 80 have been inserted in series with several of the main switch-magnet windings, their purpose being to equalize the resistances of parallel circuits through the main switch-magnet coils, and it will be found upon examination of the drawing that all parallel circuits are of approximately the same resistance, since the resistance elements 80 are of the same value and are approximately equal to the resistance offered by one of the main switch-magnet coils. It is obvious, however, that in order to reduce the number of resistance elements a single element or any other number desired having approximately the same total resistance may be employed, the number here shown being only for the purpose of illustrating the fact that the resistances of the parallel circuits are equal.

If the master-switch 1 is moved to position S, finger 95 engages the drum-contact 96 and the circuit is closed through the conductor 97, contact-finger 93, drum-contacts 94 and 35, finger 36, and the operating mechanism 6, which causes the said mechanism to actuate the motor-controller drum 5 through the remaining positions.

In position $g$ of the controller-drum all of the switch-magnet coils are deënergized, thus causing the corresponding switches to open; but in position $h$ the contact-finger 98 engages the drum-contact 99, and the circuit is then closed through the interlocking switch 70 75 and switch-magnet coils 76, 77, 78, 57, and 58, thus causing the switches 60, 61, 100, 101, and 102 to close. The closing of the switch 102 opens the interlocking switch 54, and it then becomes impossible to energize the switch-magnet coils 55 and 56 until after the controller-drum 5 has been returned to its initial position. Energy is now supplied to the motors 3 and 4 through the circuit from collector T, through the overload release-coil 64, switches 60 and 61 in parallel, switch 100, resistance 66, reversing-switch block 67, motor-armature 68, reversing-switch block 69, field-magnet winding 70, and switch 102, to the ground at $G^5$, and in parallel from the point 103, through the switch 101, reversing-switch block 71, armature 72, reversing-switch block 73, and field-magnet 74, to the ground at $G^4$. By the closing of the switch 60 the interlocking switch 17 is again opened, so that the reversing-switch 2 may not be operated until the master-switch is again returned to the off position.

In position $i$ of the controller-drum the magnet-coil 81 is energized and the corresponding switch 82 is closed, thereby shunting a portion of the resistance 66, and in position $j$ the magnet-coil 84 becomes energized, causing the switch 83 to close and shunt another portion of the resistance 66, the switch 82 opening for this position. The magnet-coil 87 is energized for position $k$ of the controller-drum, thereby causing the switch 88 to close and short-circuit another portion of the resistance 66.

In position $l$ of the controller-drum the magnet-coil 92 is energized in addition to the magnet-coils 87 and 84, and the switch 104 shunts another portion of the resistance 66, and in position $m$ of the controller-drum the magnet-coils 90 and 91 are energized in addition to the coils corresponding to the position $l$, thus causing the switches 105 and 106 to close and completely shunt the resistance 66, leaving the motors 3 and 4 in full parallel connection without resistance in circuit.

In position $m$ the fingers 107 and 108, respectively, engage the drum-contacts 109 and 110, thus providing parallel circuits through the resistances 111 to all of the switch-magnet coils which were previously energized, and in position $n$ the previous circuits through the switch-magnet coils are interrupted and the only remaining circuits through the switch-magnet coils include the resistances 111, which are for the purpose of reducing the amount of current required to maintain the switches in closed position.

An important advantage to be derived from the use of our system, as before stated, is that the controller-drum may be stopped at any position at the will of the operator, as may be readily understood from the fact that if the master-switch is returned to the position S after having occupied the position M the circuit through the controller 5 to the operating-coil 37 is interrupted, and consequently the mechanism 6 ceases operation. Similarly, the operation of the mechanism may be stopped in any position when the motors are connected in series by returning the master-controller to the position R.

From a point 112 on the side of the field-winding 74 farthest from the ground $G^4$ a conductor 113, in which a resistance 114 is inserted, leads to some point within the winding 41 of the time-controller 7 or to a point on the side of that winding which is farthest from the ground $G^2$. Then if the current taken by the motors 3 and 4 while they are being accelerated in speed, is greater than a certain predetermined limit, which limit may be readily determined by varying the amount of the resistance 114 or by varying the point of connection of the conductor 113 to the coil 41, sufficient current flows through the conductor 113 to energize the coil 41, and thus prevent the switch 39 from closing until the current taken by the motors has been reduced to a value smaller than the predetermined limit. Since the drop in the voltage between the point 112 and the ground $G^4$ across the winding 74 is small compared with the total potential difference between the ground G and the collector T, it is evident that the limit device employed in our system operates at a comparatively low voltage, and that consequently there is small liability of breaking down of the insulation of the time-controller-magnet coil 41. Also, since the amount of current supplied to the said coil may be governed by the resistance 114, it is evident that the limit device may be made to operate by means of very small currents.

It may be found advantageous to employ a fifth train-wire for the purpose of insuring reliability of operation of all of the controlling mechanisms in a train. As we have shown in our drawing, power may be supplied to all of the controller-operating devices from the first car or from the unit or car in which the master-controller in use is located, the motors of each unit, however, deriving power directly from collector and ground connections of their own. If the trolley or third-rail shoe on the first car should for any reason fail to make contact with its corresponding conductor, the operation of the controller-actuating mechanisms would be interrupted; but if a fifth train-conductor should be employed to connect the collector devices of all of the units power could be supplied to all of the controller-actuating mechanisms from any or all of the units in a train.

If desired or convenient, it is evidently possible to arrange the circuits of the motors so that they may be governed directly without the interposition of the unit-switches by means of the automatically-actuated controller-drum. It is also obvious that this arrangement, as well as the one in which the unit-switches are elements, may be employed to control motors which perform other functions than the propelling of trains or to control other types of apparatus.

The fifth conductor may be conveniently employed in connection with our system without greatly increasing the complication of connections or construction over what is shown, since it is only necessary to extend the conductor 10 so that it becomes a train-wire for connecting all of the units.

While we have shown and described the various devices employed in our system as electromagnetically operated, it is to be understood that they may be operated by any other suitable means—such, for instance, as pneumatically-actuated pistons—the inlet-valves to the cylinders being conveniently controlled by electromagnets—that is, the controller-drum may be rotated and the reversing-switch thrown by means of pneumatically-operated devices controlled by electromagnets, the circuits of which may be governed by the master-switch, and the switches in the main circuits may likewise be electropneumatic devices, the electrical circuits of which may be governed by the controller-drum. It is evident that certain of the other features of the system may be varied within reasonable limits, and we do not wish our invention limited except by such restrictions as may be imposed by the prior art.

We claim as our invention—

1. Means for operating and controlling a single vehicle or each of a plurality of connected vehicles comprising a plurality of electric motors, a set of unit-switches for varying the relations of said motors and the resistance of their circuits and a controller for said unit-switches, in combination with a master-controller for said switch controller or controllers.

2. Means for operating and controlling a single vehicle or each of a plurality of connected vehicles comprising a plurality of electric motors, a set of electromagnetically-operated unit-switches for varying the relations of said motors and the resistance of their circuits and an electromagnetically-operated controller for said unit-switches, in combination with a master-controller for said switch controller or controllers.

3. The combination with a plurality of electric motors having armature and field-magnet windings, of a reversing-switch for adjusting the connections thereof, a set of unit-switches for varying the relations of said motors and the resistance of their circuits, a controller for said unit-switches and a master-controller for said reversing-switch and said unit-switch controller.

4. The combination with a plurality of electric motors having armature and field-magnet windings, of a reversing-switch for adjusting the connections thereof, a set of unit-switches for varying the relations of said motors and the resistance of their circuits, a controller for said unit-switches, means for automatically actuating said switch-controller, and a master-controller for said actuating means and said reversing-switch.

5. Means for operating or controlling a single vehicle or each of a plurality of connected vehicles comprising a plurality of electric motors and a set of unit-switches for varying the relations of the motors and the resistance of their circuits, a controller for said unit-switches and means for automatically actuating said controller, in combination with a master-controller for said actuating means.

6. Means for operating and controlling a single vehicle or each of a plurality of connected vehicles comprising a plurality of electric motors, a set of unit-switches for varying the relations of the motors and the resistance of their circuits, a controller for said unit-switches, and means for automatically actuating said controller.

7. The combination with electric motors and unit-switches in the circuits thereof, of controllers for said unit-switches and means for automatically actuating said switch-controllers comprising an actuating-magnet, a retaining-magnet, time controller-magnets for alternately opening and closing the circuit of the actuating-magnet winding, and a switch operated by the actuating-magnet for alternately opening and closing the circuits of the time-controller-magnet windings.

8. The combination with electric motors and unit-switches in the circuits thereof, of controllers for said unit-switches, means for automatically actuating said switch-controllers comprising an actuating-magnet, a discharge resistance in shunt thereto, a retaining-magnet, time controller-magnets for alternately opening and closing the circuit of the actuating-magnet winding, and a switch operated by the actuating-magnet for alternately opening and closing the circuits of the time-controller-magnet windings, and a master-switch for said actuating means.

9. The combination with electric motors and unit-switches in the circuits thereof, of controllers for said unit-switches and means for automatically actuating said switch-controllers comprising an actuating-magnet, a discharge resistance in shunt thereto, a retaining-magnet, time controller-magnets for alternately opening and closing the circuit of the actuating-magnet winding and a switch operated by the actuating-magnet for alternately opening and closing the circuits of the time-controller-magnet windings.

10. The combination with electric motors having armature and field-magnet windings, of reversing-switches for adjusting the connections thereof, unit-switches in the circuits of said motors, controllers for said unit-switches, means for automatically actuating said switch-controllers comprising an actuating-magnet, a retaining-magnet, time controller-magnets for alternately opening and closing the circuit of the actuating-magnet winding and a switch operated by the actuating-magnet for alternately opening and closing the circuits of the time-controller-magnet windings.

11. The combination with electric motors having armature and field-magnet windings, of reversing-switches for adjusting the connections thereof, unit-switches in the circuits of said motors, controllers for said unit-switches, means for automatically actuating the said switch-controllers comprising an actuating-magnet, a retaining-magnet, time controller-magnets for alternately opening and closing the circuit of the actuating-magnet windings, a switch operated by the actuating-magnet for alternately opening and closing the circuits of the time-controller-magnet windings and master-switches for said actuating means and reversing-switches.

12. The combination with electric motors having armature and field-magnet windings, unit-switches in the circuits thereof, controllers for said unit-switches, means for actuating said controllers, and time controller-magnets for said actuating means, of a connection between the motor-circuits and one of the time-controller-magnet windings whereby said winding is energized while an excessive amount of current is supplied to the motor-circuits.

13. The combination with electric motors having armature and field-magnet windings, unit-switches in the circuits thereof, controllers for said unit-switches and means for actuating said controllers comprising an actuating-magnet, a retaining-magnet, time controller-magnets for alternately opening and closing the circuit of the actuating-magnet winding and a switch operated by the actuating-magnet for alternately opening and closing the circuits of the time-controller-magnet windings, of a cross connection between the motor-circuits and one of the time-controller-magnet windings whereby said winding is energized and the circuit of the actuating-magnet winding is maintained open while an excessive amount of current is supplied to the motor-circuits.

14. The combination with electric motors having armature and field-magnet windings, unit-switches in the circuits thereof, controllers for said unit-switches, means for actuating said controllers, and time controller-magnets for said actuating means, of a cross connection between the motor-circuits and one of the time-controller-magnet windings whereby said winding is energized and further operation of the unit-switches is prevented while an excessive amount of current is supplied to the motor-circuits.

15. The combination with electric motors, unit-switches for governing the circuits thereof, a controller for said unit-switches, actuating means therefor and a master-switch for said actuating means, of means for effecting the opening of said unit-switches when more than a predetermined amount of current is supplied to the motor-circuits and for preventing further operation of said actuating means until the master-switch has been returned to its initial position.

16. In a system of control for a plurality of units operated by electric motors each having armature and field-magnet windings, said motors being adapted to be connected in series or in parallel, reversing-switches for adjusting the said field and armature connections, unit-switches for governing said motor-circuits, a controller for said unit-switches, actuating means therefor, a master-switch for said actuating means and reversing-switches and conductors connecting the units, one corresponding to each of the forward and reverse positions of the reversing-switches and to the series and the parallel connections of the motors.

17. In a system of control for a plurality of units operated by electric motors each having armature and field-magnet windings, said motors being adapted to be connected in series or in parallel, reversing-switches for adjusting the said field and armature connections, unit-switches for governing said motor-circuits, a controller for said unit-switches, actuating means therefor, a master-switch for said actuating means and reversing-switches and conductors connecting the units, one corresponding to each of the forward and reverse positions of the reversing-switches, to the series and the parallel connections of the motors and to each of the other predetermined positions of the master-switch.

18. In a system of control for a plurality of units operated by electric motors each having armature and field-magnet windings, said motors being adapted to be connected in series or in parallel, reversing-switches for adjusting the said field and armature connections, unit-switches for governing said motor-circuits, a controller for said unit-switches, actuating means therefor, a master-switch for said actuating means and reversing-switches and conductors connecting the units, one corresponding to each of the forward and reverse positions of the reversing-switches and to the series and the parallel connections of the motors and one for conducting power between their units.

19. Means for operating and controlling a single vehicle or each of a plurality of connected vehicles comprising a plurality of electric motors having armature and field-magnet windings, a set of independently-actuated unit-switches for varying the mutual relation of said motors to the supply-circuit, means for actuating said switches and a controller for said actuating means, in combination with a master-switch for governing the said controller or controllers.

20. Means for operating and controlling a single vehicle or each of a plurality of connected vehicles comprising a plurality of electric motors having armature and field-magnet windings, a set of unit-switches and a reversing-switch for adjusting the mutual relation of said armature and field-magnet windings to the supply-circuit, means for actuating said unit-switches, and a controller for said actuating means, in combination with a master-switch for governing the operation of said reversing switch or switches and said controller or controllers.

21. Means for operating and controlling a single vehicle or each of a plurality of vehicles connected together comprising a plurality of electric motors, a set of unit-switches for varying the mutual relation of said motors to the supply-circuit, and a controller for said unit-switches, in combination with a master-controller for said unit-switch controller or controllers.

In testimony whereof we have hereunto subscribed our names this 31st day of May, 1904.

THOMAS S. PERKINS.
RAY P. JACKSON

Witnesses:
H. B. MYER,
BIRNEY HINES.